(12) United States Patent
Hastings

(10) Patent No.: US 6,332,217 B1
(45) Date of Patent: *Dec. 18, 2001

(54) SOFTWARE INVENTORY CONTROL SYSTEM

(75) Inventor: Lawrence C. Hastings, Mountain View, CA (US)

(73) Assignee: Hearme, Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/075,310

(22) Filed: May 8, 1998

Related U.S. Application Data

(60) Provisional application No. 60/046,153, filed on May 9, 1997.

(51) Int. Cl.[7] ................................................. G06F 9/445
(52) U.S. Cl. ........................................ 717/11; 717/3; 707/1
(58) Field of Search .................................. 395/701, 712, 395/333; 717/3, 11; 707/203, 1; 713/1, 100

(56) References Cited

U.S. PATENT DOCUMENTS

| | | | | |
|---|---|---|---|---|
| 5,142,680 | * | 8/1992 | Ottman et al. ........................ | 717/11 |
| 5,247,683 | * | 9/1993 | Holmes et al. ...................... | 709/221 |
| 5,555,416 | * | 9/1996 | Owens et al. ........................ | 717/11 |
| 5,574,898 | * | 11/1996 | Leblang et al. ...................... | 707/1 |
| 5,581,764 | | 12/1996 | Fitzgerald et al. .................... | 717/3 |
| 5,623,604 | * | 4/1997 | Russell et al. ...................... | 717/11 |
| 5,649,200 | * | 7/1997 | Leblang et al. ...................... | 717/3 |
| 5,694,546 | * | 12/1997 | Reisman ............................. | 705/26 |
| 5,734,831 | * | 3/1998 | Sanders ............................. | 709/223 |
| 5,794,052 | * | 8/1998 | Harding ............................. | 717/11 |
| 5,802,297 | * | 9/1998 | Engquist ............................ | 709/212 |
| 5,809,287 | * | 9/1998 | Stupek, Jr. et al. ................. | 395/500.43 |
| 5,845,077 | * | 12/1998 | Fawcett ............................. | 709/221 |
| 5,875,306 | * | 2/1999 | Bereiter ............................ | 709/220 |
| 5,889,942 | * | 3/1999 | Orenshteyn ........................ | 713/201 |
| 5,901,320 | * | 5/1999 | Takahashi et al. ................... | 717/11 |
| 5,905,492 | * | 5/1999 | Straub et al. ....................... | 345/333 |
| 5,933,816 | * | 8/1999 | Zeanah et al. ...................... | 705/35 |
| 5,940,074 | * | 8/1999 | Britt, Jr. et al. .................... | 345/333 |
| 6,009,274 | * | 12/1999 | Fletcher et al. ..................... | 717/11 |
| 6,012,088 | * | 1/2000 | Li et al. ............................ | 709/219 |
| 6,094,679 | * | 7/2000 | Teng et al. ......................... | 709/220 |

OTHER PUBLICATIONS

Larry Hastings, "Adding Functionally to Dollar In C," 1995, pp. 1–10.

Larry Hastings, "Dollar Basics," 1995, 1996.

AN: 92:570051, Title: Hybrid Script/Programming Language Turns Legacy Software Into Object Oriented Applications, Source; News Release, Sep. 30, 1992.*

* cited by examiner

*Primary Examiner*—Mark R. Powell
*Assistant Examiner*—Chameli C. Das
(74) *Attorney, Agent, or Firm*—Wilson Sonsini Goodrich & Rosati

(57) ABSTRACT

A method for addressing problems of computer remote software configuration management is provided wherein a computer program executes a scripting language in order to examine the software installed on a computer. In the event the script determines that software needs to be downloaded, installed or configured, it causes programs to be executed to perform these functions. Such a program enables a user to consistently get correct software installed with the correct configuration for the system, thus reducing demands for technical support and the costs associated therewith.

6 Claims, 1 Drawing Sheet

SOFTWARE INVENTORY CONTROL SYSTEM

This application claims priority under 35 USC § 119(e) to prior Provisional patent application Ser. No. 60/046,153, filed May 9, 1997, by inventor Lawrence C. Hastings, which application is incorporated herein by reference in its entirety.

FIELD OF THE INVENTION

The present invention relates to the field of electronic computers, and more particularly to the field of software for operating computers.

BACKGROUND

It is well known to have personal computers with a great many programs installed thereon. Such programs commonly have many executable components and other software components which, though they do not contain executable instructions are nonetheless essential to the correct functioning of the software in its totality. Moreover packages of software are supplied by multiple vendors and are intended to work together.

Problems arise when software components are shared between software packages and where software exists in more than one version. Typically software comes to exist in more than one version when new versions are introduced. Often the software supplier envisages and responds to the need of the user who migrates from one version of a package to a newer version of a substantially similar package from the same supplier.

Where packages rely upon third party components they are often installed onto computers along with those third party components. Problems can arise when a version of a shared software component needs to be replaced by a newer version. A typical scenario might be that if a first software package requires a revised version of a first shared component then it happens sometimes that a second software package which worked quite well with the older version of the first shared software component but it will not work well if the older version of the first shared software component is replaced with a newer version. Pursuing this example, it may be that the second software package is in fact capable of working well with newer version of the first shared software component, but only if a further (second) shared software component is also replaced by a still newer version.

Dependencies of software versions one upon another such as those alluded to above can become cascaded or even recursive leading to complex configuration problems. When cooperating software is distributed across multiple distributed computers the problems are further compounded by a need to synchronize versions spatially and temporally.

Commercial products such as OilChange™ and IBM (R) OS/400™ Operating System address these problem with a degree of success. Embodiments of the present invention contain improvements over the artificial intelligence based and other approaches embodied in the prior art.

SUMMARY OF THE INVENTION

The invention is addressed to problems of computer remote software configuration management.

The invention executes a scripting language in order to examine the software installed on computers and wherever the script determines that software needs to be downloaded, installed or configured it causes programs to be executed to perfonn these functions.

One benefit is that users more often get correct software installed, correctly configured.

Another benefit is that demands for technical support are reduced with corresponding saving of money.

The invention comprises improvements in a number of ways including those expressed in the following: Embodiments of the invention lets us control exactly what kind of software gets used on computer based online services, ensuring that our client and server software remain in sync. It also ensures that a client's software is running smoothly, which cuts down on technical support calls. Most other systems only let you copy files down, or set configuration settings in a one-shot manner. Embodiments of the invention can ensure that every detail of a client machine is correctly set before allowing it to continue. The script-driven model of the invention gives us this flexibility.

Embodiments of the invention are superior to other work done in the field in that, inter alia, there is flexibility in checking and reconfiguring the client machine. The fact that embodiments of the invention use a scripting language is novel, and the fact that the scripting language is what actually drives the whole process is unique.

DESCRIPTION OF AN EMBODIMENT

Figure 1:
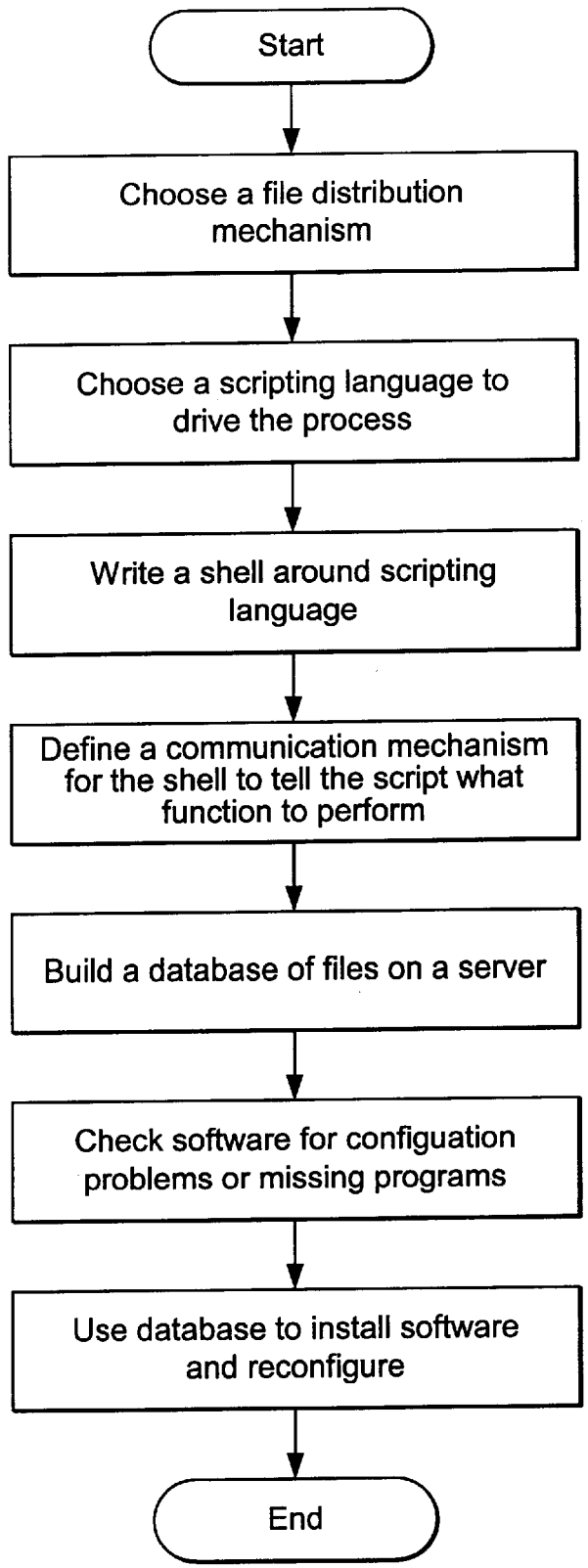
FIG. 1 is a flow chart illustrating the general process of the invention.

This particular embodiment of the invention is referred to as an Inventory Control System (ICS). This description provides all that a programmer ordinarily skilled in the art needs by way of direction to build a working embodiment.

An ICS is a script-driven configuration maintenance program that runs on client machines and ensures that their configuration is correct. First, one must decide upon a file distribution mechanism-how to get the files from the central server (which is under your control) to the client. In the present embodiment, HTTP protocol was chosen, which means the use an off-the-shelf server to distribute ICS files is possible. An example of another reasonably suitable protocol would be FTP, but HTTP is a better choice (as one does not need the flexibility of FTP).

The next step is selection of a scripting language. It should be a general-purpose scripting language, it should be embeddable, and it should be easily extensible so system-specific configuration modification entry points can be added. This is a standard tool in computer programming. Two examples of such a language are TCL and Perl 5.

Next, one would write a shell around the script language that displays status and perhaps progress information. Since the present invention was implemented under Windows 95, the inventor had the script language run in its own thread, and communicate status and progress information via static data using synchronized access (a mutex around all accesses). The shell should also extend the script language with functions that will be useful for configuration management. When completed, the following functions can be performed:

Change system configuration settings

Rename files

Edit the contents of files

Examine files (perform checksum routines on files)

Define a communication mechanism for the shell to tell the script what function it should perform. Assuming that a script language with subroutines is being used, the best way is to have a single script subroutine that is the main entry point for all functionality, the arguments should specify what actions are to be taken (checking or repairing), and what package is to be examined.

Note that it is imperative that the script language is driving the entire process. This is part of the point of using a scripting language; the more the script language is in control, the more you will be able to modify the behavior of the system from the script. But for speed purposes it is preferred to have the script language controlling the process with a high degree of abstraction.

Now begin writing the scripts to drive the checking process. One must build a database of checksums and sizes of all versions to be supported, and generate that into data for the script. Note that it is not advisable to build every file into the checksum database-one should check a subset of all files, which will be used to extrapolate which version they have. For most products, building a database of checksums of every file would be too time consuming in terms of calculation and maintenance. Here are two guidelines to choosing which files should go into the database:

All executables. If all known executable files are correct, then if there is further damage at least it should be able to report a useful error message. If the executables are not known to be good, then they may not run well enough to produce useful messages.

Enough files so that every version is unique. Every version should differ from every other version by at least one file. If two versions are so far exactly the same, you should either add a file to the database of checksums that differs between the two versions, or you should remove one of the versions (because it is redundant).

A database of files on the server used to correct the user's software must also be built. Two varieties of files are used:

1) "patch" files, which are built using RTPatch from PocketSoft of Texas (http://www.pocketsoft.com/). This is an archive file containing instructions to RTPatch's software on how to modify a set of files. This "patch" is used for old software versions, and modifies them so that they match the current version.

2) "single file download" (or SFD) files. These are the files used in the checksum database, compressed and stored on the server for download.

One must also write the script subroutines to perform the checking. The present embodiment uses a two-stage process: first a stochastic spot-check, and then a thorough check. The stochastic check works like this:

For each file F in the list of files
  is F the correct size?
    if so, it randomly decides whether or not to calculate a checksum for F
    if not, it will always calculate a checksum for F
  are we calculating a checksum for F?
    if so, calculate a checksum for F.
      does it match the checksum of a "current" version?
      if so, continue.
      if not, return failure.
    if not, continue.
Since we have gone through the list of all files and not discovered any problems, return success.
If the stochastic check returns success, the checking returns success.
If the stochastic check returns failure, perform a thorough check.

The thorough check should simply examine every file in the list, determine the file's checksum, and correlate that with the database of checksums. The script needs to determine three main things:
  what version is the user's software?
  does the user's software consistently mirror that version, or are there discrepancies?
  what files need to be downloaded to ensure the user is running the current version of the software?
Here's how each of these questions should be answered:
  The user's version is whatever version has the largest number of files in common with the files on the user's machine. If there are 15 files in the list of files to be checked, and two versions, and the user's files match 14 out of 15 for version 1 and 8 out of 15 for version 2, then the user has version 1.
  If the user's files consistently match all files for a particular version (in the above example, 15 out of 15), then yes, otherwise no.
  If the user's files match an older version of the software, you should download a "patch" file to patch them to the current version. If the user's files don't consistently match a particular version, you should download the SFD files for all of those files. Note that you should download all SFD files_before_starting the patch, otherwise the patch will not succeed.

DESCRIPTION OF A FURTHER EMBODIMENT

This further embodiment is known as "TRUST NO ONE: THE MPATH MPLAYER INVENTORY CONTROL SYSTEM".

The game service known as Mplayer is a wonderful place, full of happy campers all gleefully shooting each other up. But there could be trouble in paradise. How can we help novice users keep their software up-to-date? How can we prevent loathsome cads from hacking their games, giving themselves an unfair advantage? Enter the Inventory Control System, or ICS. This ICS does the following things:
  Spot-checks the Gizmo, and all games, to make sure they haven't been tampered with
  Ensures that it itself hasn't been tampered with (!)
  Checks that all software is up-to-date
  Automatically updates out-of-date software, where possible, and with the user's permission Terninology A checksum is a number used to ensure the accuracy of some data. For instance, if your mom told you to go to the store and buy eggs, milk, gin, bourbon, and vodka, you could say "okay, that's five things"; and when you were standing in the checkout line, you could count what you had in your basket—and if you didn't have five, you'd know you forgot something, like the vodka. A better, if more arcane example, would be your Algebra teacher giving a test and saying, "When you're done, add up all your answers; they should add up to 708. If they don't, you goofed."

Here is how to actually use a checksum. First, get a copy of the file that is known to be good. Then run the checksum algorithm over that file. This gives something back; generally a number, perhaps in hexadecimal. Then, later, if it is necessary to ensure the file is the same, run the checksum algorithm over it again, and see if the same result came back. If it did, chances are good it is the same file. If not, then the file is not the same.

A CRC is a particular kind of checksum, called a cyclical-redundancy checksum. One of the checksum algorithms used in the ICS is a 32-bit CRC, creatively called CRC32.

MD5 stands for Message-Digest 5. It's a checksum algorithm written by RSA and Associates, and it's also used in the ICS.

Dollar is a small scripting language. In summary, it's a general-purpose macro language, designed to make HTML even more configurable and easy-to-manage. But it will do far more than that. It's totally extensible, and easy to deal with from C. In the early stages of designing the ICS, the collective opinion was that a small scripting language would offer the most flexibility for the smallest amount of download time. So, Dollar has been used for all scripting done in the ICS. This document does not contain allot of Dollar code, so one can get through it without understanding Dollar. Further information about Dollar can be obtained from the Dollar Reference. Note that the Dollar scripts used with the ICS use the extension ics, as in Roadmap.ics.

A GameID is a number that represents a particular game. For instance, Terminal Velocity is GameID 2, and Locus is GameID 4. Where you see something like GameGameID.ics this means that for Locus this file would be called Game4.ics. By the way, the Gizmo itself is GameID 0; and it gets checked just like everybody else.

Automated Game Scripts

The process of creating game scripts has been automated. Here is all that must be done:

First, create a list of all files in the project that need checking. Then, create a "version description" file. Finally, use these as input to the game script creating batchfile, GAMESCR.BAT. This will produce an ICS script that will check each file on the user's machine Step 1: Create a list of all files in the project that need checking For a first cut, one can do exactly that. For instance, here is a sample list for the Gizmo:

c:\program files\mplayer gameway\programs\mgameway.exe
c:\program files\mplayer gameway\system\mplayer.dll
c:\program files\mplayer gameway\system\gizmo.exe
c:\program files\mplayer gameway\system\MCP.dll
c:\program files\mplayer gameway\system\mpdosgam.exe
c:\program files\mplayer gameway\system\chat.ocx
c:\program files\mplayer gameway\system\Dialogs.dll
c:\program files\mplayer gameway\system\gizmo.ocx
c:\program files\mplayer gameway\system\paint.ocx
c:\program files\mplayer gameway\system\Portrait.ocx
c:\program files\mplayer gameway\system\RT32CMP.DLL
c:\program files\mplayer gameway\system\RT32DCMP.DLL
c:\program files\mplayer gameway\system\sound.ocx
c:\program files\mplayer gameway\system\vox.dll
c:\program files\mplayer gameway\system\LEAD51N.DLL
c:\program files\mplayer gameway\system\NSPError.DLL
c:\program files\mplayer gameway\system\NSPLib.DLL
c:\program files\mplayer gameway\system\register.exe
c:\program files\mplayer gameway\system\version.txt Bootstrapping the ICS In the arcane field of computer security, it is generally held that without physical security (i.e. the computer is in a locked and guarded room in the cellar), real security is impossible, and even then you're still of course open to software bugs.

Obviously, as the Mplayer GameWay is going to be installed on every Pentium computer ever sold, physical security is impossible. We can come close, though, which is probably close enough. After all, a first person guesses that maybe a tenth of a percent of potential customers will be interested in hacking and skilled enough to do it.

In order for a security system to be useful, first it must ensure that it itself is secure. First, the ICS downloads the file http://www.mpath.com/larry_tests/Roadmap.crc. (Note that this path will change before we go to Beta-2.) This file is a Dollar script, defining two variables: RoadmapCRC32 and RoadmapMD5. These variables contain the CRC32 and MD5 strings, respectively, for the known-good current copy of the file Roadmap.ics (which we'll get to in a minute). This script is run, which creates the two variables in the Dollar symbol table and exits.

Then the CRC32 and MD5 of the current Roadmap.ics are calculated, and checked to see if they match the ones just gotten out of the Roadmap.crc. If they do not match, there is an out-of-date (or tampered with) copy of Roadmap.ics, and a fresh one is downloaded from http://www.mpath.com/larry_tests/Roadmap.ics before proceeding to the next step.

Now one knows that Roadmap.ics can be trusted. One then runs it, which itself is also a Dollar script, also containing mainly variables. Specifically, for each GameID that exists, Roadmap.ics must define a variable called GameGameIDScript which contains a URL to where to find the current copy of the game-specific ICS script for that game (GameGameID.ics). In addition, it must contain either a variable called GameGameIDCRC which contains a URL for where to find the CRC file for that GameID (GameGameID.crc), or contain the CRCs themselves:

GameGameIDCRC32

GameGameIDMD5

Now one can determine for each game whether one trusts its ics file or not. If one runs the checksums, and they do not match what was obtained from the .crc file (or from the Roadmap), one knows the file is out of sync, and one can go download a new one.

The Game Script

Roadmap.ics is a Dollar script mainly containing variable declarations. So is Roadmap.crc, and all of the GameGameID.crc files. What of the GameGameID.ics files, hereafter called a "game script"? Well, those look very different indeed. But before we delve into one, let's examine everything that a game script has to do. It has to:

Determine whether a game distribution is the current version or not, and if not, determine whether
  the game is merely out-of-date, or hacked
  the game can be updated automatically, or must be updated manually by the user
  the game can be upgraded for free, or whether the user must pay for the upgrade
  the game is still playable with this version, or must be updated before the user can play the game Automatically update the game, if appropriate Here is how this is accomplished. First, there are many predefined requests, called "actions", one can ask of the game script. So far, there are these:

CheckGame

Check the game and ensure it is the current version.

FreeAutomatedUpgrade

Download the free upgrade and install it.

PayAutomatedUgrade
  Download the paid upgrade and install it. Not yet implemented, or even clearly defined.
AutomatedReinstall
  Reinstall the software automatically.
When run, each of these actions will return one of the following return values:
  Success
  CheckingAborted
  GameIDNotHandled
  WrongGameID
  StillRunning
  BadEnvironment
  NotCurrentVersion
    This last one isn't just one return value; if bit 30 is set, then bits 0–29 are a bitfield indicating what's wrong with the current version, and what can be done about it.
    NOTE: Make sure the return value is greater than zero! Some of the return values are small negative numbers, and in a two's-compliment negative number, bit 31, and 30, and 29 . . . will all be set. To be sure that this is a NotCurrentVersion error, check that the return value is greater than zero and that bit 30 is set. A macro for this function will be added soon.
    The existing bits are:
PayForUpgrade
  Means they must pay for the upgrade to the newer version; if not set, the upgrade is free.
AutomatedInstallation
  Means the upgrade/reinstallation can be done automatically for the user; if not set, the upgrade must be done manually.
UnknownVersion
  Means the version is not one we've seen before—the CRCs don't match any known version CRCs. This raises some hackles, as it may mean a hacked version. If not set, the current version is a known (if old) version.
VersionAllowable
  Means this version is still allowed to play on the network; if unset, the user must upgrade before they can play this game.
How does this work in the game script? First, they use some extensions to Dollar tailored for the ICS:
Action
  A variable indicating which function of the script is requested.
CRC32
  A function taking one argument, containing the name of a file. Returns the CRC32 of that file, or a blank string if the file does not exist.
MD5
  A function like $CRC32{}, but returning the MD5 checksum.
Return
  A function; causes the script to exit immediately, "returning" its argument as the exit status. (If $Return {} is not used, the output of the script is examined as a number.)
StopChecking
  A function, which returns whether the Gizmo has requested that the ICS abort its current operation.
    Those five things, plus predefined constants for all the actions and return values above, and plus everything Dollar will already do, and we've got all the tools we need to check a game. Here is an example of a fictional, but complete game script for the Gizmo:
$Set{RegistryMain;HKEY_LOCAL_MACHINE\Software\Mpath\Mplayer\Main}$Switch{$Action;Equals;
  $CheckGame;
  $If{$NotSame{Beta 1.1;$GetRegistryKey{$RegistryMain\Current Version}}
  ;
  $Return{$BinaryOr{$NotCurrentVersion;$AutomatedInstallation}}
  }
$If{$Equals{bac490fe;$CRC{$SystemDirectory\gizmo.exe }}
  ;
  $Return{$Success}
  ;
  $Return{$BinaryOr{$NotCurrentVersion;$UnknownVersion}}
  }
;
$FreeAutomatedUpgrade;
  $SetRegistryKey {$RegistryMain\Current Version;Beta 1.1 }
$WriteHttpToFile{http://www.mpath.com/larry_tests/gizmo.exe;$SystemDirectory\gizmo.exe}
;
$Return{0}
}

This script will check the Gizmo to see if the version number is correct; if it is not, it will return immediately, saying it has detected an old version but that we can upgrade it automatically. If the version number is correct, it checks to see whether the CRC32 checksum for gizmo.exe is correct; if not, it is damaged, and must be reinstalled manually. If both things pass, it returns success.

If asked to run an automated upgrade, it fixes the version number in the registry, and downloads a new gizmo.exe.

Dollar allows a lot of leeway for style. Future game scripts will have to store all known CRC32 and MD5 values for current and previous versions of the games; the current plan is to write those game scripts like this:
$Switch{$Action;Equals;
  $CheckGame;
  $Set{CurrentVersion;Version 1.3}
  $Set{File1Filename;$SystemDirectory\gizmo.exe}
  $Set{File1CRC_bac490fe;Version 1.0}
  $Set{File1CRC_ee4052a0;Version 1.1}
  $Set{File1CRC_271a553c;Version 1.3}
  $Set{File2CRC_a7f033b8;Version 1.0}
  . . .
  $Set{FileCount;19}
  $Set{I;1}
  $While{$LessThan{$I;$FileCount};
    $Set{CRCVariable;File$I$CRC_$CRC{$Lookup{File$I$Filename}}}
    $If{$Exists{$CRCVariable}
      ;
      $Comment{if it fails the CRC check, return, otherwise continue checking}
      $If{$NotSame{$Lookup{$CRCVariable};$CurrentVersion}
        ;
        $Return{$BinaryOr{$NotCurrentVersion;$AutomatedInstallation}}
        }
      ;
      $Return{$BinaryOr{$NotCurrentVersion;$UnknownVersion}}
      }

```
}
$Return{$Success}
;
$FreeAutomatedUpgrade;
...
}
```

In effect, the code above creates variables representing each known good CRC (if more than one version have the same CRC for the same file, just store the most recent version, since that is all that matters) and then dynamically create a variable name out of the actual file's CRC. If the variable exists, I know which version the file is; if it does not, it's an unknown version (alert! alert!).

The ICS Programming Interface

How does a programmer deal with the ICS? The ICS is implemented as an import DLL called mpics.dll, with the following relevant entry points:

DWORD ICSInitialize(void)

Initialize the ICS system. Currently, initializes the Dollar parser/symbol table.

DWORD ICSShutdown(void)

Shuts down the ICS system. Currently, ensures the thread has exited cleanly, and shuts down the Dollar parser/symbol table.

DWORD ICSRoadmap(void)

Validates the roadmap, and reads it in. This should be called after ICSInitialize() but before any calls to ICSStart().

ICS_t ICSStart(DWORD GameID, char *Action)

Starts a separate thread of execution running, on the specified GameID, with the specified action. If there is already an ICS thread running, it stops it before starting a new one.

DWORD ICSRequestStop(ICS_t ICS)

Requests that the current thread cease its checking.

DWORD ICSStop(ICS_t ICS)

Forces the thread to stop (requests a stop, and blocks until the thread does exit), and then frees the thread and the ICS object.

DWORD ICSGetStatus(ICS_t)

Gets the status of the current ICS thread of execution.

HANDLE ICSGetHandle(ICS_t, DWORD ID)

Gets the handle to a Win32 "Event" synchronization object for the ICS.

Here is a list of the valid handles:

ICS_HANDLE_PROGRESS

This Event gets strobed every time the Progress number changes.

It automatically resets.

ICS_HANDLE_PROGRESS_DESCRIPTION

This Event gets strobed every time the Progress Description changes (see ICSGetString(), under ICS_PROGRESS_DESCRIPTION). It automatically resets.

ICS_HANDLE_COMPLETION

This Event gets set high when the current ICS thread is done. It is manually reset by the ICS.

DWORD ICSGetDword(ICS_t, DWORD ID)

Requests additional free-form information about the state of the game checking.

Here is a list of the valid IDs for ICSGetDword:

ICS_DWORD_PROGRESS

The estimated progress of the current ICS thread. A number between 0 and 100. char *ICSGetString(ICS_t, DWORD ID) Requests additional free-form information about the state of the game checking.

Here is a list of the valid IDs for ICSGetString:

ICS_STRING_ERROR_DESCRIPTION

A textual description of the error that just occurred. Should not be checked while the ICS thread is running (while ICSGetStatuso returns ICS_STILL_RUNNING).

ICS_STRING_PROGRESS_DESCRIPTION

A textual description of the current operation for the progress dialog. void ICSFreeString(ICS_t, DWORD ID, char *Information)

Frees information returned by ICSGetString(). (It is, by the way, alright to call this even while ICSGetStatus() returns ICS_STILL_RUNNING.) ID indicates which bit of information the string corresponds to.

char *ICSSetString(ICS_t, char *Variable, char *Value)

Sets a variable/value pair in the Dollar parser for the ICS.

Optional Enhancement

There are some definite improvements needed for the ICS before it is ready for prime-time.

All scripts may be stored as plaintext. While the scripts are tamper-proof (as the ICS will merely download a fresh copy of any scripts that don't match their CRCs), nevertheless it would help if they were not so tantalizingly configurable on the end-user's machine. All scripts will be encoded using RSA public-key encryption, which means that scripts will only be encodable at Mpath. The hardcoded paths to the website may even be encoded inside the executable.

Alternatively ICS scripts have been stored as user-opaque. They're not encrypted, per se, just sort of obfuscated, which ought to be close enough. This is an excellent idea, by the way, and is mentioned prominently.

Almost everything the ICS downloads is compressed-scripts, patches, SFD'd files, everything. Anything the ICS can do to minimized download times is worthwhile.

The gizmo will run without MpLaunch having prepped it, though many games will not work. (The only thing that MpLaunch does to prep the Gizmo is add things to the path.) Another answer here is to encrypt the Gizmo executable, and have the loader decrypt on the fly each time it runs.

The ICS scripts will keep tabs on every extant version of the software. This means one can always tell the difference between a hacked version and a merely outdated one. Whenever one detects a hacked version, this should send a message down the wire to a secure server at Mpath, noting that there has very likely been a cracked copy of the software. That user can then be monitored.

There must be a way for game developers to be able to develop and test their games without breaking the ICS. The best idea on this to date is to assign each game two GameID numbers; one for the released version that everyone uses, and one which is only used for development purposes, which has purposely lax security. (Perhaps the easy solution here is to use the high bit of the GameID to indicate "development version".)

The script needs to intelligently handle low disk-space conditions.

Additionally, here are some extra thoughts on possible functionality in the ICS:

Dollar is a particularly sensitive language right now; it's easy for the entire rest of a file to get swallowed up by a missing curly-brace or whatnot. It would be nice to harden Dollar against some of these mistakes, as well as write some sort of Dollar lint program that checked Dollar scripts for accuracy.

Currently, when a new script is downloaded, the disk file is opened, written to, and closed, and then it's opened again for reading. It's possible that the script could get switched between when it was closed and when it was reopened. This could be finessed internally to use the same FILE * both times, which would patch a marginal security hole.

The reason the Roadmap.ics was designed as a central clearinghouse for finding games and CRCs and such was to keep down the amount of net traffic, something viewed as a plus in the ICS meeting we had a few weeks back.

Suppose the following occurs:
 The user goes into a game
 The ICS checks the game; it's out-of-date, but there's an automated upgrade available
 The user says "okay, start the automated upgrade"
 While the upgrade is in progress, the user wants to change to a different game Right now, this means aborting the download in progress, as we need to check the newly selected game, and the Dollar symbol table isn't reentrant, so we can't have two things going at once.

The foregoing description of embodiments of the present invention has been presented for purposes of illustration and description only. It is not intended to be exhaustive or to limit the invention to be forms disclosed. Obviously, many modifications and variations will be apparent to practitioners skilled in the art.

What is claimed is:

1. A method for checking system configuratiotis on a terminal for current updated software, the method comprising:

implementing a shell around a scripting language to provide a system configuration script;

accessing the system configuration script on the terminal from an other computer coupled to the terminal via a network;

signaling the system configuration script from the other computer to examine whether a system configuration in the plurality of system configurations contains versions of software that require updating; and reconfiguring the system configuration with updated software if the system configuration contains versions of software that require updating.

2. The method of claim 1, including using the system configuration script to determine if a file content on the terminal is outdate, and updating the content of the file if the content of the file is outdate.

3. The method of claim 1, including using the system configuration script to determine if a registry on the terminal is out-of-date, and updating the registry if the registry is out-of-date.

4. The method of claim 1, wherein reconfiguring the system configuration by installing updated versions of software if the system configuration has identified incompatible versions of software upon examination of one or more executable files on the terminal.

5. The method of claim 1, including using the system configuration script to perform functions including:

determinig if a name of a file on the terminal is out of date and updating the file on the terminal; and determining if a registry on the terminal is out of date and updating the registry on the terminal.

6. A system or checking system configurations on a terminal, the system comprising:

means for implementing a shell around a scripting language to provide a system configuration script;

means for accessing the system configuration script on the terminal from an other computer coupled to the terminal via a network;

means for signaling the system configuration script to check a system configuration in the plurality of system configurations for versions of out of date software that require updating, and;

means for reconfiguring the system configuration with consistent updated software when versions of out of date software are detected .

* * * * *